(No Model.)  2 Sheets—Sheet 1.
V. ANGERER.
ACTUATING DEVICE FOR CAR BRAKES.
No. 463,433. Patented Nov. 17, 1891.
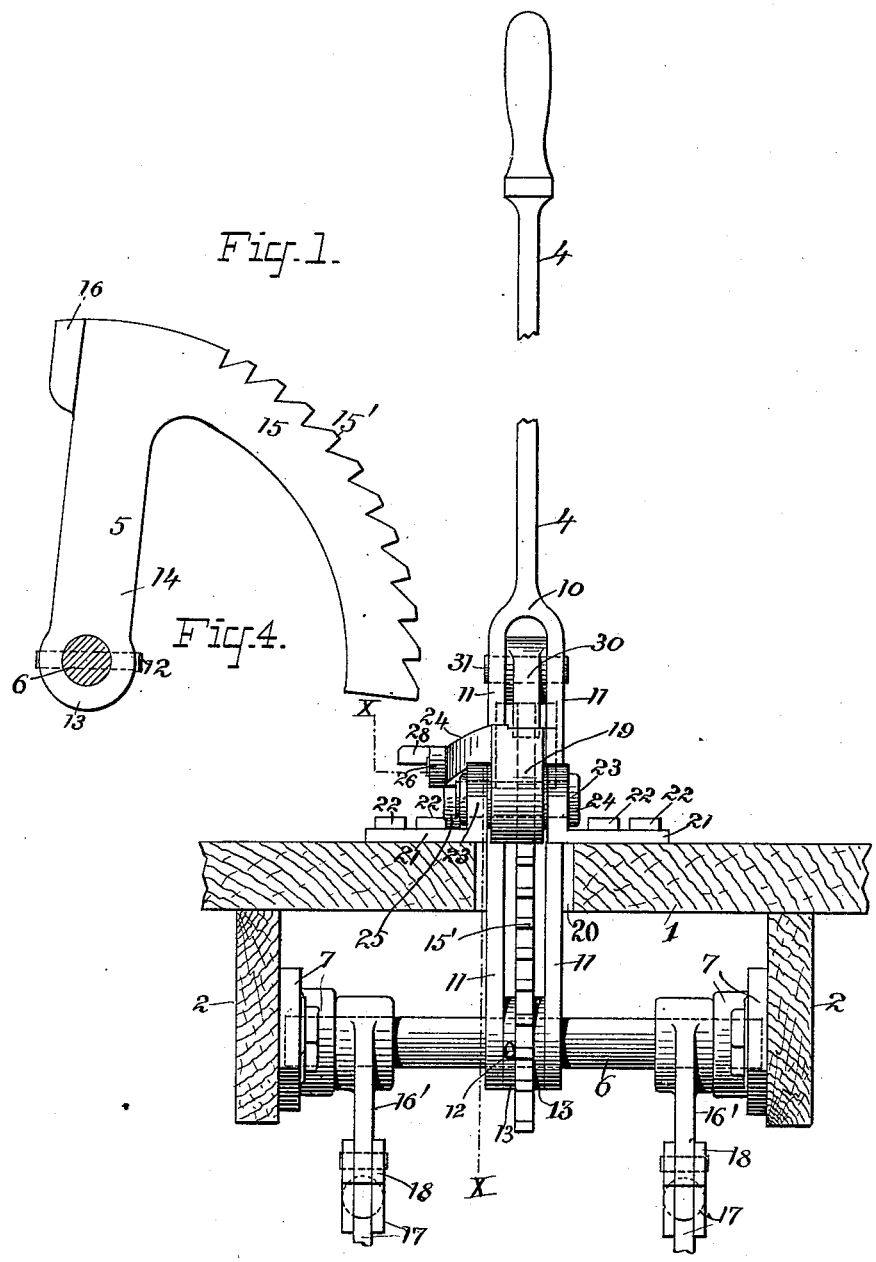
ATTEST:
INVENTOR:
Victor Angerer (No Model.) 2 Sheets—Sheet 2.

V. ANGERER.
ACTUATING DEVICE FOR CAR BRAKES.

No. 463,433. Patented Nov. 17, 1891.

ATTEST:
Fred A. Baker
Herbert F. Dunlap

INVENTOR:
Victor Angerer
by Joseph L. Levy
Atty

THE NORRIS PETERS CO., PHOTO-LITHO., WASHINGTON, D. C.

UNITED STATES PATENT OFFICE.

VICTOR ANGERER, OF PHILADELPHIA, PENNSYLVANIA.

ACTUATING DEVICE FOR CAR-BRAKES.

SPECIFICATION forming part of Letters Patent No. 463,433, dated November 17, 1891.

Application filed April 15, 1891. Serial No. 389,014. (No model.)

*To all whom it may concern:*

Be it known that I, VICTOR ANGERER, a citizen of the United States, residing at Philadelphia, in the county of Philadelphia and State of Pennsylvania, have made new and useful Improvements in Actuating Devices for Car-Brakes, &c., of which the following is a specification.

My invention relates to certain improvements in devices for actuating car-brakes by means of which the brakes can be effectively applied to the wheel, and any play or lost motion in the brake-connecting devices be taken up expeditiously and the brakes can be kept or held in a position whereby the time of application to the wheels may be changed to suit varying conditions and the operating-lever freed and put in position for further application of the brakes without releasing the hold of the brake-shoes upon the wheels, and means for releasing the operating devices and the brake-shoes independently of each other or simultaneously, said invention involving the employment of a lever made in sections, each section movable about the same fulcrum, and devices whereby the lever-sections may be operatively united, whereby the independent or joint operation of the lever-sections may be secured.

Figure 3:
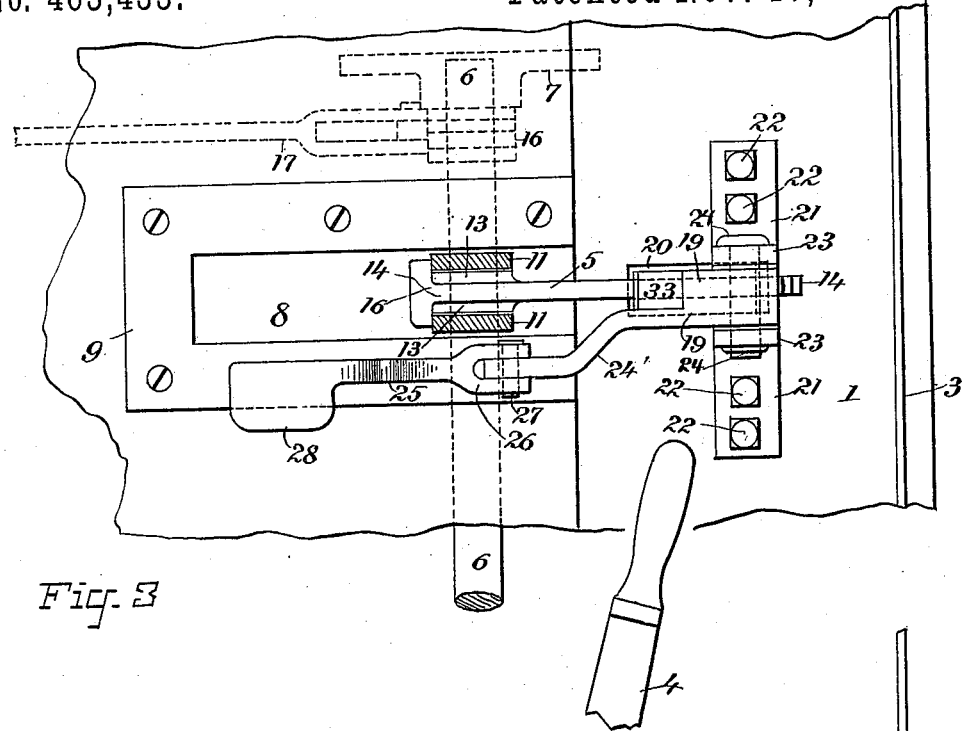
Figure 2:
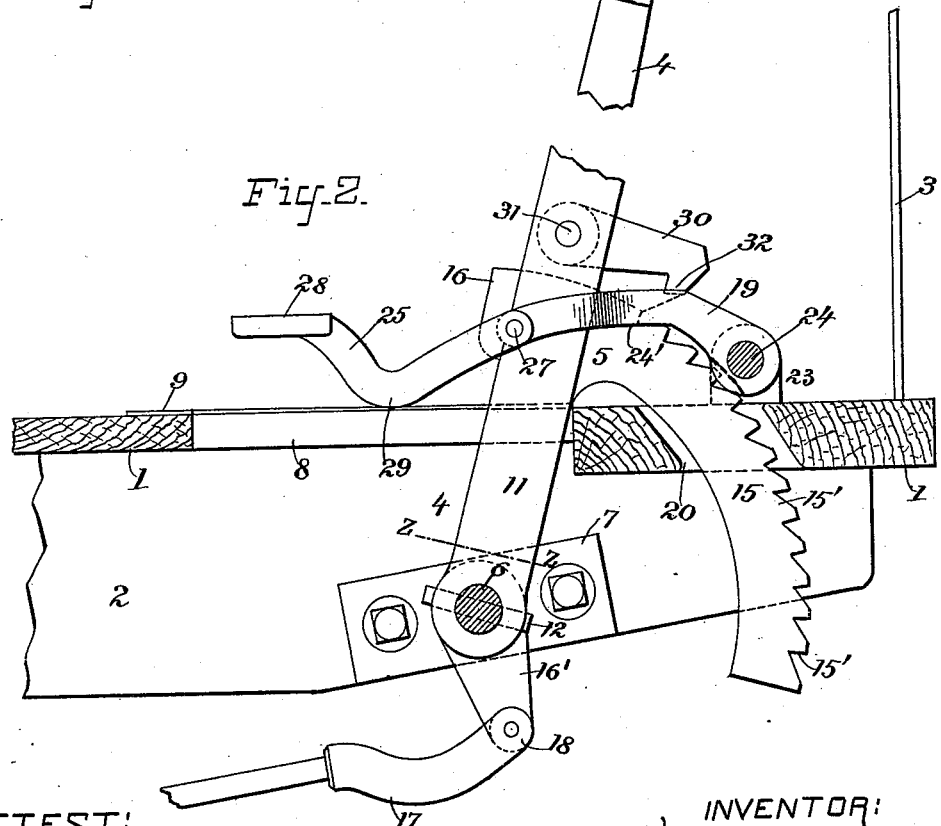

In the accompanying drawings, which show only those features deemed necessary for illustration of a suitable embodiment of my invention, and which is adapted for operating the brake of street-railway cars, Figure 1 is a front elevation; Fig. 2, a side elevation, partly in section, taken on the lines $x$ $x$, Fig. 1; Fig. 3, a plan view of the same, partly in section, said section being taken on the line $z$ $z$, Fig. 2; and Fig. 4, a detail view of the supplemental section of the operating-lever, hereinafter to be described.

In accordance with the mechanism illustrated in the drawings, the brake-actuating devices are shown as supported upon the platform or end flooring 1 of the car, and the longitudinals 2 thereof.

At 3 is shown a dash-board.

The controlling-lever of the actuating mechanism is made in two parts, consisting of the main section or handle portion 4 and the lower or supplemental section 5, and these parts are pivotally and yet independently united by a spindle 6, which constitutes the fulcrum about which both the lever-sections rock. The spindle 6 finds bearings in the journals 7, secured to the longitudinals 2, and the arrangement of spindles and bearings may be made as shown in Fig. 1, where the longitudinals are brought close together and the spindle 6 extending between them, or there may be the arrangement shown in Fig. 3, in which there is but one bearing shown, the spindle finding another bearing at some other suitable point and extending wherever desired. Between these bearings a slot 8 is cut in the platform, said slot being surrounded by the metallic plate 9. Another slot 20 is cut in the platform, and in which the supplemental section 5 works. The spindle 6 passes under the slot 8, said slot being of sufficient dimensions to provide room for ample movement of the lower sections. The lever 4 is preferably in single section for the greater part of its length, and is bifurcated from 10 downward, the forks 11 being pivotally secured upon the spindle 6. The supplemental section 5 is securely fastened to the spindle 6 by a pin 12 passing through its hub 13, and has an upwardly-extending arm 14, Fig. 4, which arm is located between the forks 11 of the main lever 4. The supplemental section 5 has a forwardly-extending segment 15, provided with teeth 15', the radius of this segment being in the center of the spindle 6. The top and back end of the supplemental section is provided with a stop 16, which extends transversely of the said supplemental section, its ends being wide enough to engage with the forks 11 of the main lever section 4. This stop engages with the lever 4 when said lever is rocked to apply or set the brakes.

From the foregoing it will be seen that the main section 4 and the supplemental section 5 find mutual fulcrum in the spindle 6, and that the main section is free to move about the supplemental section. The spindles 6 may be connected with the brake-shoes in any suitable way, or as shown in the drawings, in which the spindle has the downwardly-projecting crank arm or arms 16', which should be securely fastened to the said spindle, and to the crank-arm the brake-arm 17 is pivotally secured, the crank-arm 16' passing into the bifurcated ends 18.

In order that the supplemental section of the controlling-lever may be locked in its position of adjustment when in actuating the brakes the lever is operated, I provide a pawl 19 for engagement with the teeth 15' of the segmental rack 15. This pawl is controlled in a suitable way to disengage it from the teeth on the segment to release the operating-lever when the brake is to be thrown out of action. To accomplish this, I locate, preferably at each side of the slot 20, brackets 21, which are secured to the flooring 1 of the car by the bolts 22. The brackets have upwardly-extending arms 23, through which the spindle 24 extends. This spindle forms the fulcrum for the pawl 19, and the pawl may either be secured to the spindle and the spindle made movable in the brackets or fixed therein and the pawl made movable on the spindle.

The means for releasing the pawl 19 is as follows: Extending out from the pawl 19 is an arm 24', which is pivotally secured at its end to a bent foot-lever 25. The inner end of the foot-lever 25 is bifurcated, as at 26, and is provided with a pin 27 for pivotally securing the pawl-arm 24 and it together. The foot-lever 25 has a bend which is adapted to bear on the plate 9 and to oscillate or slide thereon, as the case may be. The foot-lever also has a foot-plate 28, on which the foot of the operator is applied to release the pawl.

The foregoing description embraces devices whereby when the main section is operated to apply the brakes—that is, to the left of Fig 3—the devices for holding the supplemental section in a set position to either keep the brake-shoes applied or in readiness for quick application, and also devices for freeing the supplemental section and releasing the brakes—that is, these devices comprise means whereby the main section or lever on being moved in the proper direction sets the brakes or places the brake operating or actuating device in position for quick application of the same, means for holding the actuating lever in any position it assumes in either moving the brakes to the wheel or in setting them in any position whereby the rapidity of application of the brakes to the wheel may be varied to suit the exigencies of any particular occasion.

To provide for the further vibration of the main lever, or, for example, the tightening of the brake-shoes after their application to the wheel, or for the taking up of any slack in the mechanism which may exist during the actuation of the devices, I provide what I term an "operating-pawl," secured to and working with the main lever-section, the function of which is to engage with the teeth of the segment after said segment has been operated to apply the brakes and the pawl 19 is holding the segment in the position required for the setting of the brake. After such operation of the segment some of the teeth 15 are exposed and the operating-pawl engages with these teeth when the main lever 4 is actuated to further apply the brakes, the stop 16 then not being used for this purpose. This pawl is shown at 30, and is pivotally secured by means of the pin 31 between the forks 11 of the main-lever section 4, it being so located that its finger 32 will engage with the radial walls of the teeth 15. The pawl 19 is provided with an inclined surface 33, upon which the finger 32 of the pawl 30 is adapted to slide, for a purpose hereinafter described. It will thus be seen from the foregoing that I have provided means for connecting the sections of the controlling-lever so that said sections may be rocked together in one direction as though made of a single piece, while providing also for independent movement, as desired, of the sections about their jointed connections, the sections being adjustably coupled together by the mechanism hereinbefore described.

In operation, (with the parts in position, for example, as shown in Fig. 2,) when it is desired to apply the brakes, the main lever-section 4 of the actuating device is moved away from the dash-board 3, during which operation the stop 16 on the supplemental lever-section will engage with the main section 4, thus moving the supplemental section of the lever (now coupled with the main section) in the same direction and operating the brakes through the connection between them and the supplemental lever-section, or until the desired limit of motion is reached. The pawl 19 now locks or holds the supplemental lever-section in the position in which it is shown by the engagement of said pawl with teeth 15' of the segment 15, (the pawl 19 falling into position by its own weight,) and thereafter, by tripping this pawl, the actuating devices and brakes are freed from control. When, however, as it sometimes happens with brake-actuating mechanisms, the controlling-lever cannot be given sufficient throw to properly apply the brakes because of the limited space allowed for movement of the lever, or by reason of some slack or lost motion in the brake system, or by reason of the desirability of having the mechanism set in various positions for the purpose hereinbefore described, it would in the operation of my improvement be only necessary to return the lever by reversing the movement of the lever-handle, and then again moving it away from the dash-board, to reapply or set the brakes. In reversing the lever to apply further action upon the brake mechanism the two sections of the lever are automatically uncoupled, the supplemental lever-section being held by pawl 19 and the lever moving away from the stop 16. The pawl 30 can now be readily applied to the teeth of the supplemental lever-section to move it and the brake mechanism again by said pawl 30 falling into these teeth by its own weight, or it may be assisted by a spring, &c.

In renewing the action of the controlling-lever upon the brake mechanism the two sections of the lever become again coupled together in the described manner through pawl 30 and the teeth in segment 15 and at the end of the continued movement given to the supplemental section of the lever it becomes firmly held by the pawl 19. When in releasing the brake mechanism there is not room enough because of the dash-board or other obstacles for movement of the main lever-section while coupled with and compelled to partake of the swing of the supplemental lever-sections, then the lever-sections are uncoupled by raising the pawl 19, thus allowing independent movement of the supplemental section to swing to the extent desired without moving the handle-section.

Specifically the brake can either be released suddenly by moving the lever 4 back to its original position, so that the finger 32 on the pawl 30 will ride on the inclined surface 33 on the pawl 19, whereby the pawl 30 will be withdrawn from engagement with the toothed segment, and by pressure on the foot-plate 28 of the bent arm 29, sliding it on the plate 9 a sufficient distance to lift the pawl 19 out of engagement with the toothed segment, which will allow the supplemental section 5 to move back quicker to its original position or that of rest, or it can be let back gradually by first disengaging the pawl 19 by pressure on the foot-plate 28 and allowing the main and supplemental lever-sections to move forward together, the pawl 30 on the lever-section being engaged with the teeth or segment 15, then permitting the pawl 19 to again engage with the last tooth in segment, which will hold the supplemental lever-section in position for further action, then moving the main lever-section 4 back until it strikes the stop 16, and then repeating the former action, by which operation the brakes can be slowly released and the device set for subsequent manipulation.

Various modifications may be made in my improvements without departing from my invention—as, for instance, the means for tripping the pawl 30, instead of being applied to the pawl 19, can be so secured as to otherwise secure this function, and the main lever-section 4 need not of necessity be bifurcated, and other devices for releasing the pawl 19 from the toothed segment 15 may be adopted.

I claim as my invention—

1. In a brake-operating device, the combination of a main lever, a supplemental lever, both levers having a mutual fulcrum, a segmental rack on the supplemental lever, a stop on the supplemental lever, whereby said lever may be operated to apply the brakes, a controlling-pawl pivotally secured to engage with the segmental rack, another pawl for holding said rack in a given position, and a device for withdrawing said controlling-pawl from the rack, substantially as described.

2. In a brake-operating device, the combination of a main lever, a supplemental lever, both levers having a mutual fulcrum, a segmental rack on the supplemental lever, a stop on the supplemental lever, whereby the said lever may be operated to apply the brakes, a controlling-pawl pivotally secured to the main lever and adapted to engage with the segmental rack, and another pawl for holding the said rack in a given position, substantially as described.

3. In a brake-operating device, the combination of a main lever, a supplemental lever, both levers having a mutual fulcrum, a segmental rack on the said supplemental lever, a stop on the supplemental lever, whereby the said lever may be operated to apply the brakes, a pawl pivotally secured to the main lever and adapted to engage with the segmental rack, another pawl for holding said rack in a given position, and means for releasing said last-mentioned pawl from said rack, substantially as described.

4. In a brake-operating device, the combination of a main lever, a supplemental lever, both levers having a mutual fulcrum, a segmental rack on the said segmental lever, a stop on the supplemental lever, whereby the said lever may be operated to apply the brakes, a pawl pivotally secured to the main lever and adapted to engage with the segmental rack, another pawl for holding said rack in a given position, and means for releasing said last-mentioned pawl from said rack, comprising a jointed foot-lever having a foot-plate and bearings for said foot-lever, substantially as described.

5. The combination, in devices for actuating car-brakes, &c., of the controlling-lever composed of a main section and a supplemental section adapted for connection with the mechanism to be actuated by the lever, the lever-fulcrum at which the sections are jointed together, the pawl-and-ratchet coupling connection by the actuations of which the lever-sections may be connected to rock together in one direction or left free to rock independently of each other, and like devices by the actuations of which the supplemental sections of the lever are locked and released, substantially as described.

6. The combination, in devices for actuating car-brakes, of the jointed controlling-lever composed of a main section and a supplemental section having a rack at its end and adapted for connection with the mechanism to be actuated by the lever, and pawls for engagement with the rack of the supplemental lever and by the actuations of which the lever-sections are coupled and uncoupled and the supplemental lever-sections locked and released, substantially as described.

7. The combination, in devices for actuating car-brakes, of the jointed controlling-lever composed of a main section and a supplemental section having a stop and rack and adapted for connection with the mechanism to be actuated by the lever, and a pawl for engagement with the rack of the supplemental section, one of which is carried by the main section, and by means of the combined or independent action of these connecting devices the lever-sections are coupled and uncoupled and the supplemental lever-sections locked and released, substantially as described.

8. The combination, in devices for actuating car-brakes, of the jointed controlling-lever composed of a main section and a supplemental section having a rack and adapted for connection with the mechanisms to be actuated by the lever, pawls for engagement with the rack of the supplemental lever-sections and by the actuations of which the lever-sections are coupled and uncoupled and the supplemental lever-sections locked and released, and pawl-controlling devices by the actuations of which the lever-sections are uncoupled preparatory to freeing the supplemental lever-section from its holding-pawl, substantially as described.

9. In devices for actuating car-brakes, &c., the combination of the jointed controlling-lever composed of the main section and the supplemental section with a rack, a pawl on the main section, another pawl, and pawl-controlling devices mounted independently of the sections, the independently-mounted pawl being adapted to raise the pawl carried by the main lever out of the said track, substantially as described.

10. In devices for actuating car-brakes, the combination, substantially as set forth, of the main lever-section, the supplemental lever-section, the fulcrum-pivot about which the lever-sections rock, the pawl-and-rack connections between the supplemental sections and the platform-support, a pawl carried by the main lever-section, and pawl-controlling devices supported independently of either section, whereby said main section and its attached pawl and the pawl-controlling devices may be used in different positions, substantially as described.

11. The combination, with the bifurcated lever 4, mounted on the spindle 6, of the lever 5, secured to the spindle 6 between the forks 11, the transversely-disposed stop 16 on the lever 5 for contact with the lever 4, and the crank-arm 16' on the spindle 6, substantially as described.

12. The combination, with the bifurcated lever 4, pivotally secured to the spindle 6, a pawl 30, having the finger 32 pivotally secured to the lever 4, of the lever 5, fixed to the spindle 6 within the forks of the lever 4, a transversely-disposed stop 16 on the lever 5 for contact with the lever 4, a segmental rack 15, extending from the lever 5, and a pawl 19, suitably pivoted over the said rack, and a crank-arm 16', fixed to the spindle 6, substantially as described.

13. The combination, with the bifurcated lever 4, pivotally secured to the spindle 6, a pawl 30, having the finger 32 pivotally secured to the lever 4, of the lever 5, fixed to the spindle 6 within the forks of the lever 4, a transversely-disposed stop 16 on the lever 5 for contact with the lever 4, a segmental rack 15, extending from the lever 5, a pawl 19, suitably pivoted over the said rack, an inclined way 33 on said pawl, the pawl 30 being adapted to ride on said inclined way, a suitably-supported jointed foot-lever 24' 25, extending from the pawl 19 and having a foot-plate 28, and a crank-arm 16', fixed to the spindle 6, substantially as described.

14. The combination, with the platform or support 1, having longitudinal sills 2, a spindle 6, rotatively secured to the sills, of a bifurcated lever 4, pivotally secured to the spindle, a slot 8 in the platform through which the rod 4 passes, a pawl 30, having the finger 32 pivotally secured to the lever 4, a lever 5, fixed to the spindle 6 within the forks of the lever 4, a stop 16 on the lever 5, a segmental rack 15, extending from said lever, a slot 20 in the platform for said rack, a pawl 19, suitably pivoted over said rack, an inclined way 33 on said pawl, a suitably-supported jointed foot-lever 24' 25, extending from the pawl 19 and having a foot-plate 28, and a crank-arm 16', fixed to the spindle 6, substantially as described.

Signed at the city of Philadelphia, county of Philadelphia, and State of Pennsylvania, this 11th day of April, 1891.

VICTOR ANGERER.

Witnesses
A. G. MILLER,
JAMES McGARVEY.